J. IRVINE.
WHIFFLETREE-IRONS.
No. 7,804. Reissued July 24, 1877.
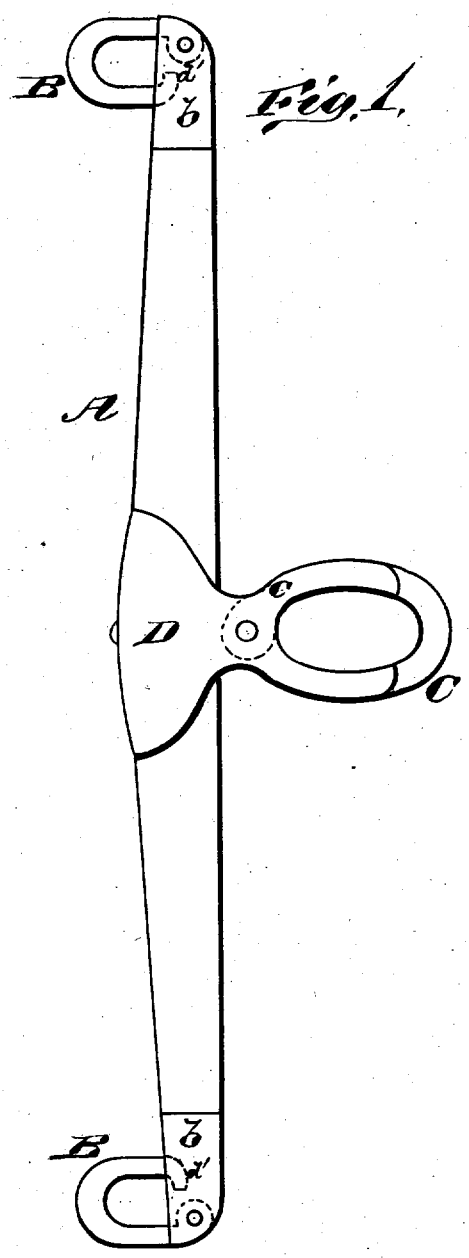
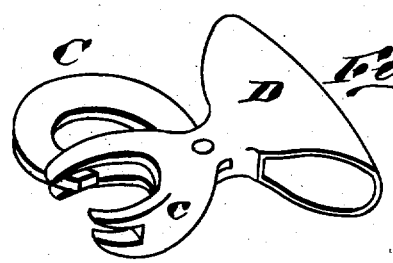
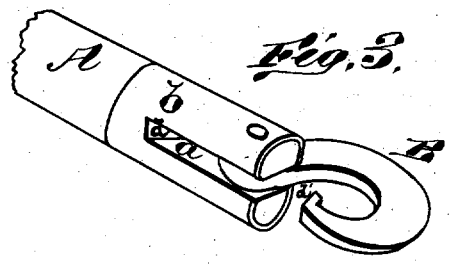
WITNESSES
Emory H. Bates
George E. Ellham
John Irvine INVENTOR.
Gilmore, Smith & Co.
ATTORNEYS.
N. PETERS, PHOTO-LITHOGRAPHER, WASHINGTON, D. C.

UNITED STATES PATENT OFFICE.

JOHN IRVINE, OF ICKESBURG, PENNSYLVANIA.

IMPROVEMENT IN WHIFFLETREE-IRONS.

Specification forming part of Letters Patent No. 188,912, dated March 27, 1877; Reissue No. 7,804, dated July 24, 1877; application filed June 23, 1877.

*To all whom it may concern:*

Be it known that I, JOHN IRVINE, of Ickesburg, in the county of Perry and State of Pennsylvania, have invented a new and valuable Improvement in Ironing Single-Trees; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my single-tree irons, and Fig. 2 a perspective view of the rear hook and ferrule. Fig. 3 is a perspective view of the end hook and ferrule of my single-tree irons.

This invention has relation to carriage or wagon single-trees; and the novelty consists in the construction of the end and rear hooks, and the manner of attaching the same, all as will be hereinafter more fully described and explained.

In the drawings, the letter A designates an ordinary single-tree; B, the end hooks, and C the center or rear hook. The ends of the single-tree are slotted, as shown at *a*, and provided with ferrules *b*, also slotted, to correspond with the ends of the single-tree. The end hooks B are hinged in the ferrules *b* in slots *a*, so as to shut or close into said slot toward the front of the single-tree. D represents the center ferrule, passing entirely around the single-tree, from which extends rearward the U-shaped iron *c*, with slotted arms, at butt of which is hinged the rear hook C, conforming in size and shape to said arms.

It will be seen that with this device the end hooks can easily be thrown back, and the traces released therefrom or placed therein with great facility, when the horses are at rest, and that any strain upon the traces will securely close said hooks.

The center ferrule, being of considerable length, and extending entirely around the single-tree, will add strength to the latter, and prevent its splitting by reason of any strain exerted thereon.

These irons are preferably made of malleable cast-steel.

The inner end *d* (see Fig. 3) of the slot cut in each end of the single-tree is inclined, and the outer end *d'* of the hook is bent over to conform with the inclined end of the slot, so that when the strain of an animal pulling is exerted upon the traces, (the force exerted upon them being slightly oblique to the forward direction of the animal,) the ends *d'* of the hooks B are constantly made to bear against the inclined ends *d* of the slots, so that there is no liability of the trace becoming detached.

What I claim as new, and desire to secure by Letters Patent, is—

1. The combination of a single-tree, A, slotted at its ends, and provided with the slotted end ferrules *b*, with the hooks B, pivoted in the slots in the ends of the single-tree, and having their ends *d'* closing into said slots, substantially as described, and for the purpose set forth.

2. The combination of the single-tree A, provided at its ends with the slotted ferrules *b* and slots *a*, having inclined ends *d*, with the hooks B, pivoted in the slots in the ends of the single-tree, and having their ends *d'* closing into said slots, substantially as described, and for the purpose set forth.

3. The hook C, hinged in, and closing into, arms *c* of ferrule D, and forming therewith a single link, substantially as specified.

In testimony that I claim the above I have hereunto subscribed my name in the presence of two witnesses.

JOHN IRVINE.

Attest:
JAS. IRVINE,
T. M. KOCHENDERFER.